(12) United States Patent
Khodakovsky et al.

(10) Patent No.: US 10,430,915 B2
(45) Date of Patent: Oct. 1, 2019

(54) MULTI-GPU FRAME RENDERING

(71) Applicant: NVIDIA Corporation, Santa Clara, CA (US)

(72) Inventors: Andrei Khodakovsky, Belmont, CA (US); Kirill A. Dmitriev, Santa Clara, CA (US); Rouslan L. Dimitrov, Santa Clara, CA (US); Tzyywei Hwang, San Jose, CA (US); Wishwesh Anil Gandhi, Sunnyvale, CA (US); Lacky Vasant Shah, Los Altos Hills, CA (US)

(73) Assignee: NVIDIA Corporation, Santa Clara, CA (US)

(*) Notice: Subject to any disclaimer, the term of this patent is extended or adjusted under 35 U.S.C. 154(b) by 25 days.

(21) Appl. No.: 15/879,377

(22) Filed: Jan. 24, 2018

(65) Prior Publication Data

US 2019/0206018 A1    Jul. 4, 2019

Related U.S. Application Data

(63) Continuation-in-part of application No. 15/857,330, filed on Dec. 28, 2017.

(51) Int. Cl.
| | | |
|---|---|---|
| *G06T 1/60* | (2006.01) | |
| *G06T 1/20* | (2006.01) | |
| *G06T 15/00* | (2011.01) | |

(52) U.S. Cl.
CPC ............. *G06T 1/20* (2013.01); *G06T 1/60* (2013.01); *G06T 15/005* (2013.01); *G06T 2200/24* (2013.01); *G06T 2210/52* (2013.01)

(58) Field of Classification Search
CPC .... G09G 5/363; G09G 5/393; G09G 2360/06; G06F 3/14; G06F 13/1663; G06F 9/5016; G06T 1/20
See application file for complete search history.

(56) References Cited

U.S. PATENT DOCUMENTS

| | | | | |
|---|---|---|---|---|
| 2011/0057939 A1* | 3/2011 | Glen | ............... | G06F 3/14 345/522 |
| 2011/0210976 A1* | 9/2011 | Diard | ............... | G06F 9/455 345/522 |
| 2014/0176586 A1* | 6/2014 | Gruber | ............... | G06F 12/0607 345/533 |
| 2014/0344528 A1* | 11/2014 | Kini | ............... | G06F 13/1663 711/151 |

\* cited by examiner

*Primary Examiner* — Hau H Nguyen
(74) *Attorney, Agent, or Firm* — Leydig, Voit & Mayer, Ltd.

(57) ABSTRACT

One or more copy commands are scheduled for locating one or more pages of data in a local memory of a graphics processing unit (GPU) for more efficient access to the pages of data during rendering. A first processing unit that is coupled to a first GPU receives a notification that an access request count has reached a specified threshold. The first processing unit schedules a copy command to copy the first page of data to a first memory circuit of the first GPU from a second memory circuit of the second GPU. The copy command is included within a GPU command stream.

19 Claims, 16 Drawing Sheets

MULTI-GPU FRAME RENDERING

CLAIM OF PRIORITY

This application is a continuation-in-part of U.S. Non-Provisional application Ser. No. 15/857,330 titled "MULTI-GPU FRAME RENDERING," filed Dec. 28, 2017, the entire contents of which is incorporated herein by reference.

FIELD OF THE INVENTION

The present invention relates to image rendering, and more particularly to frame rendering with multiple graphics processing units.

BACKGROUND

Two key performance metrics in a graphics rendering system are frame rate and latency. In many applications, such as augmented reality, reducing latency is very important for a realistic user experience. Alternate frame rendering (AFR) can improve frame rate by assigning alternate frames to a corresponding alternate graphics processing unit (GPU). However, AFR does not typically improve latency and can cause performance degradation in applications with inter-frame data dependencies. Split-frame rendering (SFR) is another technique that can improve frame rate for certain applications. However, SFR is impractical with modern workloads. Furthermore, both AFR and SFR impose certain computational and run-time restrictions that limit applicability to many current graphics applications. Thus, there is a need for addressing these issues and/or other issues associated with the prior art.

SUMMARY

A method, computer readable medium, and system are disclosed for rendering graphics frames using multiple graphics processing units (GPUs). The method schedules one or more copy commands for locating one or more pages of data in local memory of a graphics processing unit (GPU) for more efficient access to the pages of data during rendering. The method comprises receiving, by a first processing unit coupled to a first GPU, a notification that an access request count has reached a specified threshold, scheduling, by the first processing unit, a copy command to copy the first page of data to a first memory circuit of the first GPU from a second memory circuit of the second GPU, and including, by the first processing unit, the copy command within a GPU command stream. In one embodiment, the access request count indicates a number of access requests generated by the first GPU targeting a first page of data residing at a second GPU. Furthermore, the first page of data is copied to the first memory circuit through a data link coupled to the first GPU and the second GPU.

The computer readable medium includes instructions that, when executed by a processing unit, perform the method. Furthermore, the system includes circuitry configured to perform the method.

DETAILED DESCRIPTION

As described further herein, distributing rendering on multiple GPUs reduces rendering latency and provides a general and scalable GPU computation environment relative to conventional techniques. In particular, rendering on multiple GPUs provides a more general and scalable GPU computation environment than conventional split frame rendering (SFR) or alternate frame rendering (AFR) techniques.

Figure 1A:
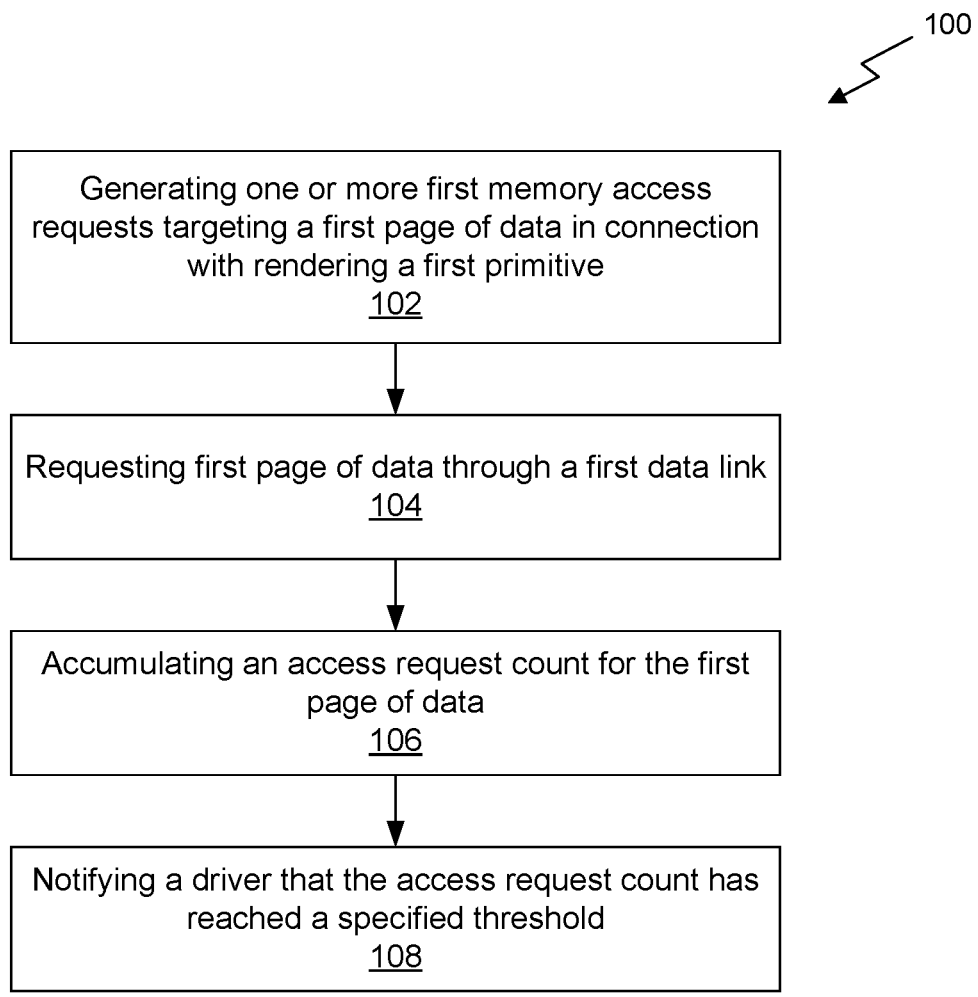
FIG. 1A illustrates a flowchart of a method for notifying a driver that a request count has reached a specified threshold, in accordance with one embodiment.
Figure 1B:
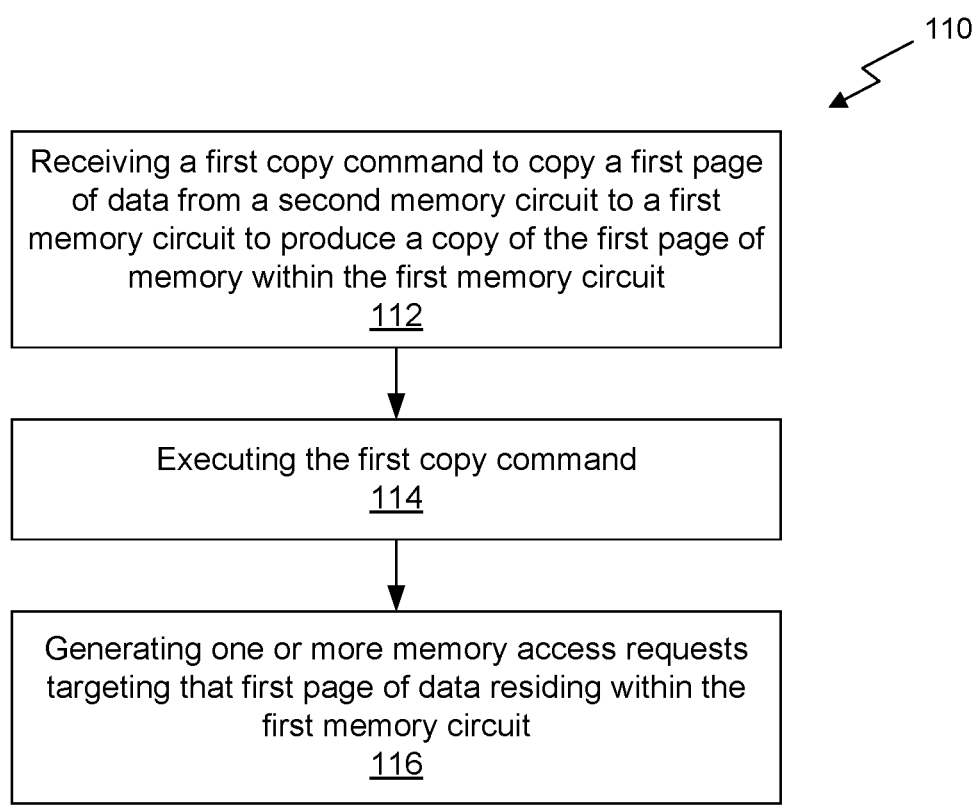
FIG. 1B illustrates a flowchart of a method for accessing a page of copied data, in accordance with one embodiment.
Figure 1C:
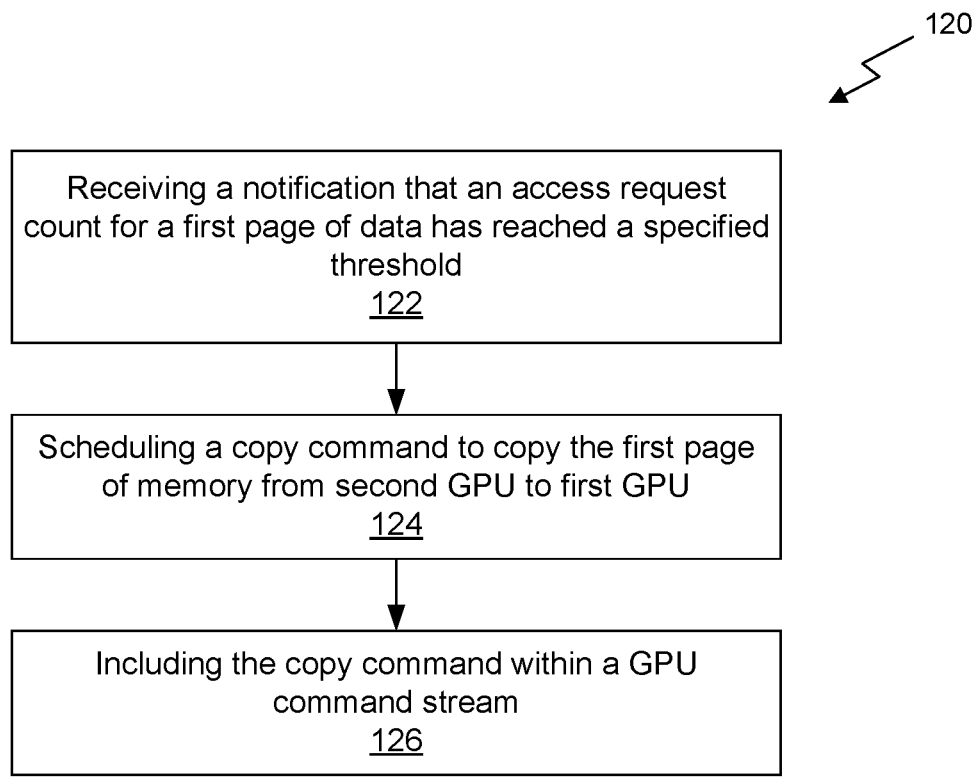
FIG. 1C illustrates a flowchart of a method for scheduling a copy command for a page of data, in accordance with one embodiment.
Figure 1D:
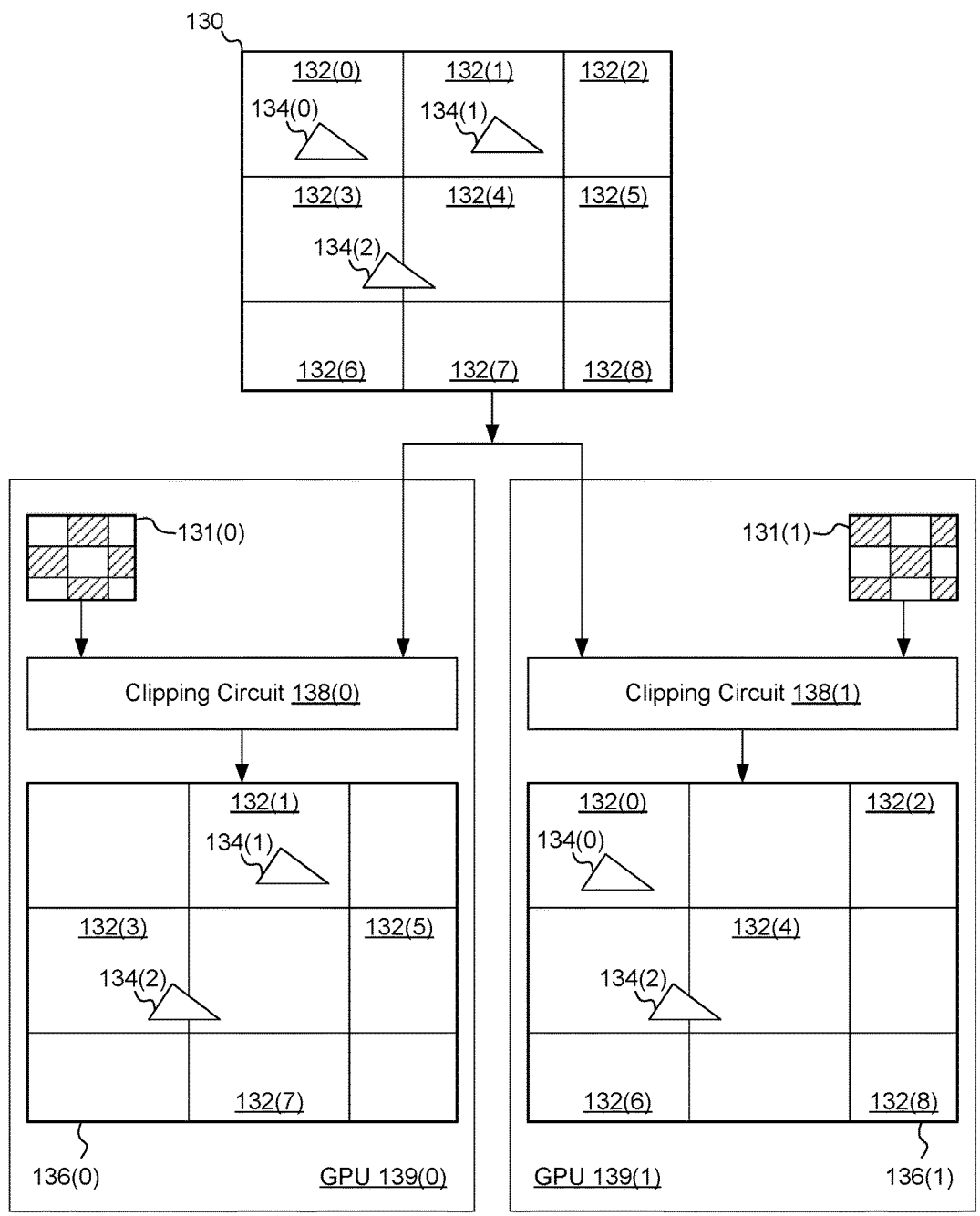
FIG. 1D illustrates a technique for allocating rendering work based on a screen space checkerboard pattern, in accordance with one embodiment.
Figure 1E:
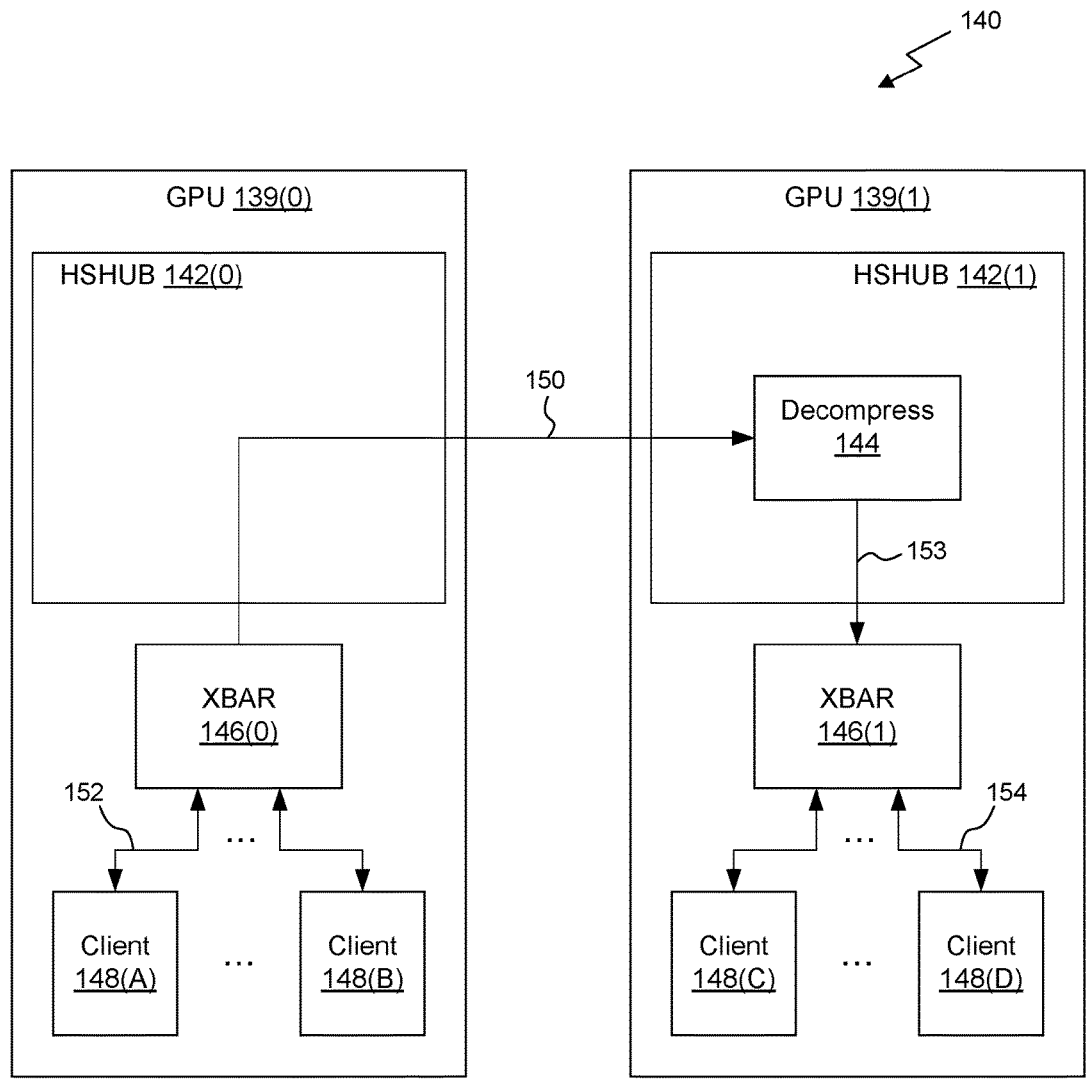
FIG. 1E illustrates a system for transmitting compressed data through a high-speed data link, in accordance with one embodiment.

In one embodiment, two or more GPUs are configured to operate as peers, with one peer able to access data (e.g., surfaces) in local memory of another peer through a high-speed data link (e.g., NVLINK, high-speed data link 150 of FIG. 1E). For example, a first GPU of the two or more GPUs may perform texture mapping operations using surface data residing remotely within a memory of a second GPU of the two or more GPUs. Based on remote memory access tracking data, the remote surface data may be copied to the local memory of the first GPU because bandwidth and/or latency of the high-speed data link may be inferior to that of a local memory interface. In certain embodiments, a given frame to be rendered is partitioned into regions (e.g., rectangular regions) forming a checkerboard pattern, with non-overlapping adjacent regions sharing a common edge in the checkerboard pattern generally assigned to different GPUs. In other embodiments, the frame is partitioned into regions that may overlap by one or more pixels (e.g., to trade off redundant computation for potentially reduced inter-processor communication). For large surfaces, the regions are aligned to memory page boundaries for render targets and distributed textures. In one embodiment, the number of regions is dynamically determined and updated for new frames to reduce remote transfers and provide overall load balancing among the two or more GPUs. The rectangles are rendered separately by the different GPUs for the frame and combined to form a complete frame in a frame buffer. In one embodiment, the frame buffer is located in local memory for one of the two or more GPUs.

In certain embodiments, primitives (e.g., represented by primitive commands) for rendering the frame are transmitted to the two or more GPUs, and hardware circuits therein provide clip windows used to select which of the primitives are included in a given checkerboard rectangle. Non-selected primitives are discarded early to reduce GPU resource utilization. In one embodiment, complete primitive discard is accelerated at a primitive engine, where a given triangle bounding box is tested for intersection with a currently active ownership region (e.g., a rectangle in the checkerboard pattern that is assigned to a given GPU). Such primitive discard can be performed by hardware logic circuits, which may be positioned in a rendering pipeline after a position transform pipeline stage. In one embodiment, the transformed attributes of a discarded triangle are not written into memory and the triangle is not rasterized, thereby saving both processing cycles and memory bandwidth. In one embodiment, pixel-exact discard is implemented in a rasterizer circuit or a rasterizer shader function.

Each of the two or more GPUs render selected primitives within assigned regions. Rendering may include multiple rendering passes, and results from one rendering pass stored in one or more surfaces may be used by the two or more GPUs for one or more subsequent rendering passes. Rendering a given pass for an assigned region on a first GPU may require remote data from a second GPU. The remote data can be fetched on demand from the second (remote) GPU in response to a request by the first GPU, or the remote data can be copied asynchronously in advance of an anticipated request to potentially achieve a lower overall latency. In many common scenarios, sequentially rendered frames are self-similar and a memory access request pattern for one frame is substantially replicated in a subsequent frame, making each frame a good predictor of access patterns in a subsequent frame. For example, two sequential frames may include substantially the same command primitives, with each generating substantially the same memory access requests while being rendered. Consequently, an access pattern observed in connection with executing a first command stream to render a first frame may be used to anticipate which blocks of memory should be copied in advance of executing a second command stream to render a second frame. In certain embodiments, data within memory pages is stored in a compressed format and remote data is copied in the compressed format to reduce overall utilization of the high-speed data link.

FIG. 1A illustrates a flowchart of a method 100 for notifying a driver that a request count has reached a specified threshold, in accordance with one embodiment. Although the method 100 is described in conjunction with the systems of FIGS. 2-7, any processing system that implements method 100 is within the scope and spirit of embodiments of the present disclosure. In various embodiments, method 100 is implemented in the context of a graphics system, configured to render graphics frames from scene information comprising graphics primitives. One or more operations of the method 100 may be performed by task-specific circuitry or by a combination of task-specific circuitry and general-purpose processing units. In one embodiment, method 100 is performed by a processing system, which may include a general purpose central processing unit (CPU), a parallel (PPU), such as PPU 200 of FIG. 2, or any combination thereof.

In one embodiment, the processing system includes a first GPU that is directly coupled to a first memory circuit, and a second GPU that is directly coupled to a second memory circuit. Furthermore, the first GPU is coupled to the second GPU through the high-speed data link. In one embodiment, the high-speed data link provides atomic peer access operations, and transfers data at a rate of at least one gigabyte per second. The first memory circuit is not directly coupled to the second GPU and the second memory circuit is not directly coupled to the first GPU.

At step 102, the first GPU generates one or more first memory access requests in connection with rendering a first primitive (e.g., executing a first primitive command) of the first command stream, where at least one of the first memory access requests targets a first page of data that physically resides within the second memory circuit. In this context, the first primitive is associated with a first frame.

At step 104, the first GPU requests the first page of data through the high-speed data link. The request may include, without limitation, a read access request. To anticipate which pages of data should be copied in advance from a remote memory to a first memory that is local to the first GPU, remote memory accesses are tracked within each GPU. Specifically, hardware counters are configured to count access requests to different pages of data in memory and report high-traffic pages to a GPU driver. The hardware counters (registers) can be configured to selectively accumulate (by incrementing) access requests to different remote pages while the frame (current frame) is being rendered. For example, the hardware counters can be configured to selectively accumulate access requests only for certain contexts or sub-contexts of a specified rendering pass. A given counter can be restricted to accumulating access requests for a specific rendering pass and may be reset at the start of the rendering pass. In one embodiment, the hardware counters each include a programmable address range for accumulating an access request count. Only an access request with an address within the programmable address range can cause any given hardware counter to increment.

At step 106, a register circuit (e.g. hardware counter) accumulates an access request count for the first page of data. For example, each access to the first page of data may cause the register circuit to increment an accumulated count by one. In one embodiment, the count is initialized at an integer value of N and the count decremented by one for each access. In another embodiment, the count is initialized (e.g., to zero) and incremented until reaching a programmed threshold count.

In one embodiment, when an access count for a particular remote page exceeds a certain threshold, the GPU driver is notified and an identifier for the page (e.g., address and rendering pass) is added to a collection of high-traffic pages. The GPU driver may be configured to schedule high-traffic pages to be copied (e.g., using a hardware copy engine) from the local memory of one GPU that writes the pages to a local memory of a second GPU that reads the high-traffic pages. With the high-traffic pages copied to the local memory of the second GPU, remote traffic can be reduced. By separating access counts according to rendering pass, the GPU driver is better able to schedule when a particular page is copied in the overall sequence of rendering for a given frame. Furthermore, by restricting which contexts are counted, the hardware counters can be allocated more efficiently.

At step 108, the first GPU notifies a driver that the access request count has reached a specified threshold (i.e., a threshold value). The driver may comprise a software driver configured to execute in any technically feasible position within a given system architecture. For example, the driver may execute within a central processing unit (CPU) responsible for managing the operation of the first GPU and the second GPU.

In one embodiment, the first primitive is rendered by the first GPU according to a first primitive command included in a first command stream for a first frame and the second frame is rendered subsequent to the first frame. In one embodiment, the first command stream specifies a first rendering pass performed in connection with rendering the first frame, and a second command stream specifies the same rendering pass performed subsequently in connection with rendering the second frame, and the notifying occurs during the rendering of the first frame.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 1B illustrates a flowchart of a method 110 for accessing a page of copied data, in accordance with one embodiment. Although the method 110 is described in conjunction with the systems of FIGS. 2-7, any processing system that implements method 110 is within the scope and spirit of embodiments of the present disclosure. In various embodiments, method 110 is implemented in the context of a graphics system, configured to render graphics frames from scene information comprising graphics primitives. One or more operations of the method 110 may be performed by task-specific circuitry or by a combination of task-specific circuitry and general-purpose processing units. In one embodiment, method 110 is performed by a processing system, which may include a general purpose central processing unit (CPU), a parallel (PPU), such as PPU 200 of FIG. 2, or any combination thereof. In one embodiment, method 110 is performed in response to receiving a copy command from the driver. Furthermore, the driver schedules the copy command upon receiving a notification, as described in step 108 of method 100.

At step 112, the first GPU receives a first copy command to copy the first page of data from the second memory circuit through the high-speed data link to produce a copy of the first page of data within the first memory circuit. In one embodiment, the first copy command is executed before the first GPU accesses the first page of data in connection with rendering the first primitive. In one embodiment, the first primitive is rendered by the first GPU according to a first primitive command included in a first command stream for a first frame and the second frame is rendered subsequent to the first frame. Rendering the first primitive for the second frame may cause the first GPU to generate one or more second memory access requests for data residing within the copy of the first page of data residing within the first memory circuit.

At step 114, the first GPU executes the first copy command to copy the first page of data from the second memory circuit (local memory of the second GPU) to the first memory circuit (local memory of the first GPU). At step 116, the first GPU generates the one or more second memory access requests targeting the first page of data residing within the first memory circuit in connection with rendering the first primitive for a second frame.

FIG. 1C illustrates a flowchart of a method 120 for scheduling a copy command for a page of data, in accordance with one embodiment. Although the method 120 is described in conjunction with the systems of FIGS. 2-7, any processing system that implements method 120 is within the scope and spirit of embodiments of the present disclosure. In various embodiments, method 120 is implemented in the context of a graphics system, configured to render graphics frames from scene information comprising graphics primitives. One or more operations of the method 120 may be performed by task-specific circuitry or by a combination of task-specific circuitry and general-purpose processing units. In one embodiment, method 120 is performed by a processing system, which may include a general purpose central processing unit (CPU), a parallel (PPU), such as PPU 200 of FIG. 2, or any combination thereof. In one embodiment, a driver executing within the CPU is configured to perform method 120.

At step 122, the driver receives a notification that an access request count for the first page of data has reached a specified threshold. For example, in the course of rendering the first frame, the first GPU may access the first page of data, residing in the second memory circuit of the second GPU, as described in step 104 of FIG. 1A. When the first GPU accesses the first page of data a number of times equal to the specified threshold, the first GPU notifies the driver, causing the driver to receive the notification, as described in step 108 of FIG. 1A. Alternatively, when the second GPU services a threshold number of access requests to the first page of data from the first GPU, the second GPU may notify the driver, causing the driver to receive the notification.

At step 124, the driver schedules a copy command to copy the first page of data from the second GPU to the first GPU. In practice, the first page of data may reside within the second memory circuit of the second GPU, or within a cache circuit of the second GPU. The first page of data is transmitted to the first GPU and stored as a copy within the first memory circuit of the first GPU, or within a cache circuit of the first GPU. At step 126, the driver includes the copy command within a GPU command stream for rendering the second frame. In one embodiment, the driver inserts the copy command into the GPU command stream. In one embodiment, including the copy command within the GPU stream comprises inserting the copy command into the GPU stream.

In one embodiment, the GPU command stream is the second command stream for the first GPU, and the copy command may cause the first GPU to perform a copy operation specified by the copy command. In an alternative embodiment, the GPU command stream is a command stream for the second GPU, and the copy command may cause the second GPU to perform a copy operation specified by the copy command.

In one embodiment, the copy command is included in a dedicated copy command stream for copy commands, while graphics primitives are included in a general command stream. In such an embodiment, a semaphore may be used to mediate and synchronize progress of the copy command stream and the general command stream. For example, the semaphore mechanism may be configured to guarantee completion of the copy command prior to the start of a specified rendering pass comprising commands from the general command stream that will access to the first page of data. In addition to a rendering pass serving as a synchronization barrier, individual graphics primitives and/or general commands may also serve in this way and execution of specific commands may be mediated by a semaphore.

In another embodiment, the copy command and graphics primitives are included in a unified command stream. A given copy command may execute asynchronously relative to other commands in the unified command stream, and any technically feasible technique (including a semaphore per copy command) may be implemented to provide a synchronization barrier between otherwise asynchronous copy completion and execution of commands that depend on copied data.

During normal operation, the driver may receive notifications from the first GPU, the second GPU, and, optionally, additional GPUs. In a typical usage mode, the first GPU writes data to a given page of data (e.g., during a first rendering pass) and the first GPU subsequently references the data many times for further processing (e.g., during a subsequent rendering pass). The notifications mark certain pages as high-traffic (hot) pages, which may benefit from being copied to a local memory where accesses occur locally rather than accessed repeatedly through the high-speed data link. With the notification information, the driver is able to schedule a copy command for a high-traffic page of data (e.g., the first page of data) determined during rendering of a first frame to occur prior to high-traffic access through the high-speed data link in connection with rendering a second frame. For example, the driver may schedule a copy command to copy the first page of data from the second memory circuit to the first memory circuit based on access intensity to the first page of data while one frame is rendered prior to the first GPU needing to access the first page of data to render a subsequent frame. In this way, the driver is able to adaptively manage where data resides for overall improved performance.

Allocation of rendering work between the first GPU and the second GPU may be accomplished using any technically feasible technique. One such technique is illustrated in FIG. 1D. More generally, rendering work may be allocated between two or more GPUs using any technically feasible technique without departing the scope and spirit of various embodiments.

FIG. 1D illustrates a technique for allocating rendering work based on a screen space checkerboard pattern, in accordance with one embodiment. As shown, a screen space scene 130 is divided into rectangular regions 132. Different rectangular regions 132 may be allocated to different GPUs to be rendered. In one embodiment, the rectangular regions 132 are each allocated to one of two different GPUs, according to a checkerboard pattern covering the screen space scene 130. For example, rectangular regions 132(1), 132(3), 132(5), and 132(7) may be assigned to a GPU 139(0) (e.g., the first GPU) and rectangular regions 132(0), 132(2), 132(4), 132(6), and 132(8) may be assigned to a GPU 139(1) (e.g., the second GPU). The screen space scene 130 may include primitives (e.g., geometric primitives) such as triangles 134, each of which may be located completely within a rectangular region 132, or straddle one or more rectangular regions 132. For example, triangle 134(0) is located fully within rectangular region 132(0), while triangle 134(2) straddles rectangular region 132(3) and rectangular region 132(4). In alternative embodiments, the rectangular regions 132 may be allocated to three or more different GPUs, according to a different pattern.

In one embodiment, GPU 139(0) includes a clip map 131(0), which specifies which rectangular regions 132 are to be processed by GPU 139(0). Similarly, GPU 139(1) includes a clip map 131(1), which specifies which regions 132 are to be processed by GPU 139(1). Regions to be processed by GPU 139(0) are shown as shaded in clip map 131(0), while regions to be processed by GPU 139(1) are shown as shaded in clip map 131(1). In this example, the union of both clip map 131(0) and clip map 131(1) completely covers screen space scene 130. In another embodiment, a clip map 131(0) is stored identically in GPU 139(0) and GPU 139(1), but GPU 139(1) has an invert bit set that causes GPU 139(1) to use an inverted representation of clip map 131(0). In yet another embodiment, clip maps 131 are programmatically determined by GPUs 139. For example, which rectangular regions 132 a given GPU is assigned to render (i.e., the GPU "owns") may be derived using a formula that operates on a tile coordinate space and/or scales the tile coordinate space.

Geometric primitives, such as triangles 134, may be transmitted to both GPU 139(0) and GPU 139(1), with a respective clipping circuit 138 configured to either keep or discard any given geometric primitive based on whether the geometric primitive intersects a rectangular region 132 allocated to be processed in a corresponding GPU. In one embodiment, a clipping circuit 138(0) in GPU 139(0) may be configured to discard geometric primitives that do not cover or intersect a rectangular region to be processed by GPU 139(0). Similarly, a clipping circuit 138(1) in GPU 139(1) may be configured to discard geometric primitives that do not cover or intersect a rectangular region to be processed by GPU 139(1). The clipping circuit 138 may perform any necessary transformation operations (e.g., on primitive vertices) to map geometric primitives from an arbitrary space (e.g., a world space) to screen space prior to performing clipping operations in screen space.

By discarding whole geometric primitives early, memory and computational resources are advantageously spared and each GPU 139 may operate more efficiently. Detailed pixel or sub-pixel coverage of geometric primitives may be determined during a rasterization operation on a given geometric primitive later in a rendering pipeline for the primitive.

In certain embodiments, general computation activity ("compute traffic") is distributed such that cooperative thread arrays ("CTAs" or "blocks" in Microsoft™ DirectX terminology) are split in half, with one half of the threads executed on the GPU 139(0) and a different half of the threads executed on the GPU 139(1). The splitting of CTAs can be accomplished by prepending shader code to cause an early discard of half of the CTAs at each GPU 139. In one embodiment, the clipping circuit 138 is configured to discard CTAs.

In one embodiment, a shader compiler is configured to include instructions in a CTA that perform a test on an important access to a surface towards the beginning of a CTA shader program and, using HW support, the instructions can determine whether the requested data associated with the access belongs to the local GPU. If most of the threads in the CTA return false, the CTA is killed. Note that the remote GPU performs the equivalent test on an equivalent CTA, and thus the CTA survives on the remote GPU. In light of the present disclosure, persons of ordinary skill in the art will understand that with this technique, CTA partitioning is optimal for memory locality for the chosen memory access instruction(s).

A workload 136(0) includes rectangular regions 132 allocated to GPU 139(0). Geometric primitives within rectangular regions of workload 136(0) are selected by clipping circuit 138(0) to be included in the workload 136(0). Clipping circuit 138(0) discards geometric primitives not included in a rectangular region 132 allocated to GPU 139(0). Similarly, a workload 136(1) includes rectangular regions 132 allocated to GPU 139(1). Geometric primitives to be processed by a given GPU are stored within memory for the GPU, while other geometric primitives (e.g., to be processed by a different GPU) are discarded by the GPU, thereby saving memory bandwidth and storage space. The geometric primitives discarded by one GPU are saved and processed by a different GPU. In cases where a geometric primitive covers two or more rectangular regions allocated to two or more GPUs, the geometric primitive is instantiated in each covered rectangular region and different portions of the geometric primitive may be rendered by an appropriate GPU. For example, triangle 134(1) within rectangular region 132(1) may be rendered by GPU 139(0), triangle 134(0) within rectangular region 132(0) may be rendered by GPU 139(1), and at least a first portion of triangle 134(2) is rendered by GPU 139(0), while at least a second portion of triangle 134(2) is rendered by GPU 139(1).

In one embodiment, rendering results of rectangular regions 132 are composited together within a single GPU to generate a final rendered frame. In various configurations, any number of GPUs may operate together to generate a final rendered frame. In certain embodiments, two or more final rendered frames are generated. For example, left and right frames may be generated for presentation to a user's respective left eye and right eye by a virtual-reality headset. In another example, multiple monitors are configured to display different rendered frames, such as from different camera positions (e.g., to generate a panoramic view of a scene).

FIG. 1E illustrates a system 140 for transmitting compressed data through a high-speed data link 150, in accordance with one embodiment. The system 140 includes GPU 139(0), GPU 139(1), and the high-speed data link 150. The system 140 may also include other subsystems, which are not shown here. The high-speed data link 150 is configured to transmit data between a client 148 within GPU 139(0) and a client 148 within GPU 139(1). For example, client circuit 148(A) within GPU 139(0) may transmit compressed data through an internal interconnect 152, to crossbar (XBAR) 146(0) and high-speed hub (HSHUB) 142(0). The compressed data may be transmitted over the high-speed interconnect 150 in a compressed format to a decompress circuit 144 within HSBUB 142(1) of GPU 139(1). Decompress circuit 144 is configured to decompress data transmitted in the compressed format to generate decompressed data. The decompressed data may be transmitted through internal interconnect 153 to crossbar 146(1), which may route the decompressed data to internal interconnect 154, and finally to a client circuit 148(D). In one embodiment, high-speed data link 150 comprises a commercial high-speed interconnect known in the art as an NVLink. In certain embodiments, the high-speed data link 150 is configured to transmit compressed data, thereby reducing transmission time and overall utilization of the high-speed data link 150. Client circuits 148 may include any technically feasible sub-systems within a GPU 139. For example, a client circuit 148 may include a memory interface to local memory, a cache, and so forth. In one embodiment, a compressor block (not shown) may be disposed along internal interconnect 154 and configured to compress and/or decompress traversing data. The compressor block may provide appropriately structured data for the XBAR 146 to map to different memory partitions (e.g., which may be different for the source/destination addresses).

Figure 1F:
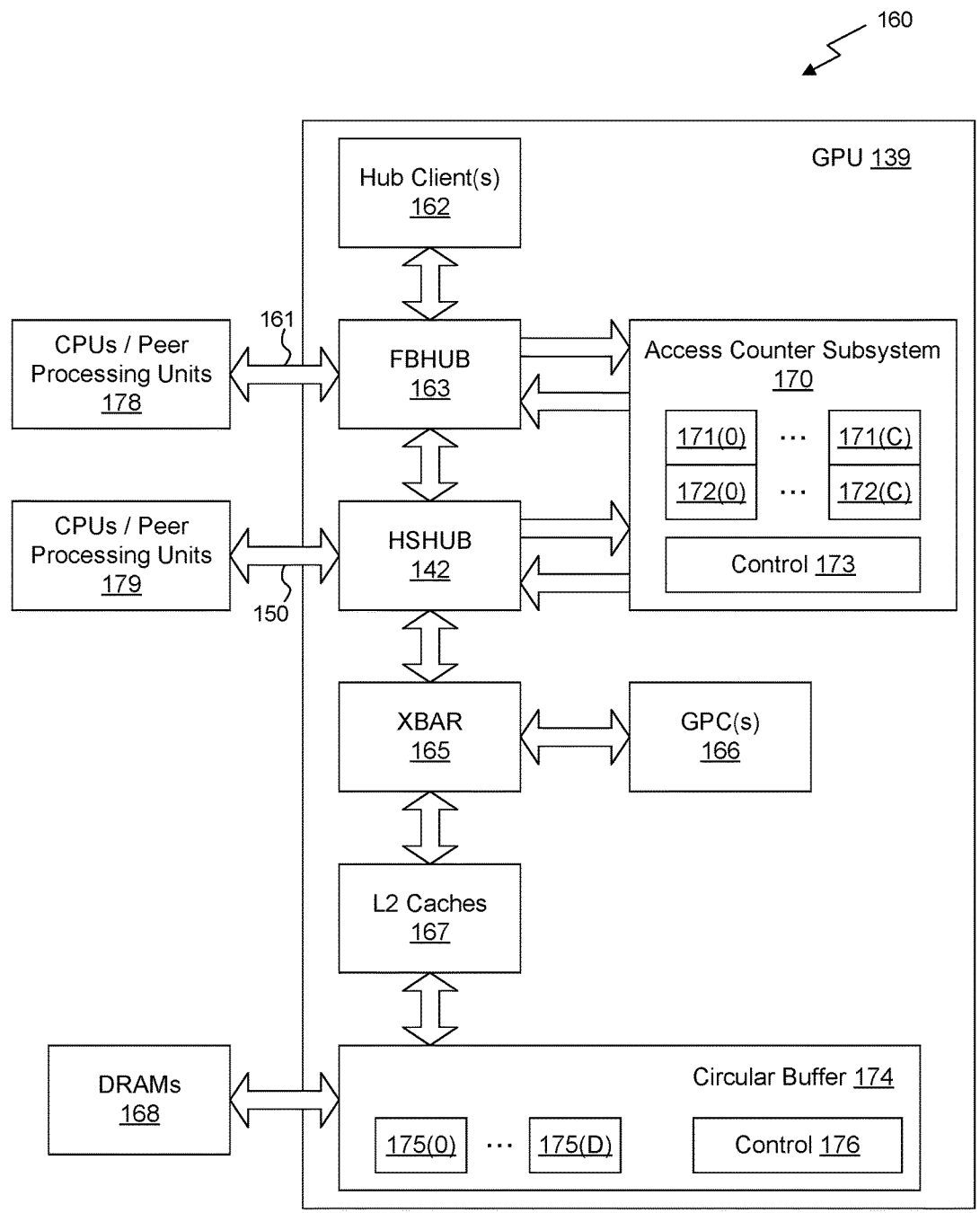
FIG. 1F illustrates a system comprising hardware counters for accumulating access request counts within a graphics processing unit, in accordance with one embodiment.

FIG. 1F illustrates a system 160 comprising hardware counters 171, 172 for accumulating access request counts within a graphics processing unit (e.g. GPU 139), in accordance with one embodiment. As shown, the system 160 includes a GPU 139 and DRAMs 168, configured as local memory directly coupled to GPU 139. In one embodiment, the system 160 includes one or more CPUs/peer processing units 178, 179.

GPU 139 includes hub clients 162, a frame buffer hub (FBHUB) 163, an HSHUB 142, at least one crossbar (XBAR) 165, one or more general processing clusters (GPCs) 166, one or more level two (L2) caches 167, and an access counter subsystem 170 comprising a number C of the hardware counters 171, 172. Furthermore, GPU 139 may also include a circular buffer 174, configured to store a number D buffer entries 175. In one embodiment, the L2 caches 167 are configured to maintain a cached copy of certain data stored within DRAMs 168 and/or stored within other memory circuits comprising the system 160.

The DRAMs 168 are configured to provide read/write storage of local data, such as programming instructions, image data, texture data, and other general data. The hub clients 162 may include specialized processing units (e.g., a primitive distributor or "PD") and other circuitry configured to process the data stored within the DRAMs 168, L2 caches 167, and/or data stored within memory circuits coupled to FBHUB 163 and/or HSHUB 142. In one embodiment, FBHUB 163 and/or HSHUB 142 are configured to provide access-specific operations related to transmitting data between a system interface 161 (e.g., PCIe), the high-speed data link 150, and internal interconnects coupled to the access counter subsystem 170, hub clients 162, and the at least one crossbar 165. In one embodiment, the GPCs 166 comprise GPCs 250 of FIG. 2, and the at least one crossbar 165 comprises crossbar 270. Furthermore, L2 caches 167 may be implemented as L2 cache 360 of FIG. 3B. The at least one cross bar 165 may include a crossbar 146 of FIG. 1E.

CPUs/Peer processing units 178, 179 may include one or more GPUs and/or one or more CPUs. The GPUs may be configured to operate as peers. In one embodiment, peer processing units are configured to provide at least one other peer processing unit with access to locally attached memory (e.g. DRAMs 168). A given processing unit may configure a memory space to include local memory in one region of the memory space and peer memory as an aperture within a different region of the memory space. When a memory request is posted within the processing unit, the memory request is either directed to local memory or a peer processing unit depending on an address range or base address for the memory request.

Access to memory from executing shaders can be provided using a generic memory routing mechanism, where a memory management unit (not shown) determines whether a requested page is remote (peer) or local. An access request to the requested page is routed accordingly as a local or remote access. In one embodiment, a peer aperture defines a memory region that is mapped to a peer GPU. Data stored within the peer aperture can be cached in a local cache and peer atomic operations can be performed through the high-speed data link 150 into peer aperture memory space. This feature is in contrast with industry standard interconnection technologies, such as PCI express (PCIe), which generally do not support the combination of aperture and peer atomic operations.

In one embodiment, the access counter subsystem 170 includes the hardware counters 171, 172 and a control circuit 173. Each hardware counter 171, 172 may include state information. The state information may include, without limitation, a current request count, a threshold count, a processing pass, a channel mask, a context, and an address range. Furthermore, the hardware counters 171, 172 may be configured to operate on virtual addresses or physical addresses. The access counter subsystem 170 is configured to have visibility into all access requests traversing at least HSHUB 142 and FBHUB 163. The visibility may include, without limitation, an address, a rendering pass identifier, a context identifier, and sub-context identifier. In one embodiment, each access request may be either to a physical address for a virtual address, and the visibility includes a physical or virtual request mode setting.

When a request address falls within a specified address range specified for a given hardware counter 171, 172, and other conditions are satisfied for the hardware counter, a current request count for the hardware counter is incremented. The other conditions may include, without limitation, a current processing pass matches a processing pass specified in the state information, a current context matches a processing context specified in the state information, and a current sub-context matches at least one true state bit in the channel mask.

A sub-context may be specified and associated with a given instance of a thread executing within the GPU 139. The channel mask may include an arbitrary number of bits (e.g., 64 bits), which may be set or cleared to either include or exclude specific threads from being counted by a given hardware counter 171, 172.

In one embodiment, a given hardware counter 171 is matched with a companion hardware counter 172. In normal operation, hardware counter 171 and hardware counter 172 may increment when necessary and identical conditions are satisfied, including a matching pass ID and a matching address range. However, when a different (new) pass ID is received, hardware counter 171 may reset the current request count. However, the current request count is not reset upon receiving a new pass ID in the companion hardware counter 172. In this way, data relevant to a specific pass may be identified for preloading prior to a specific pass, while "hot" address pages may be separately and continuously monitored and identified as potential candidates to be moved from one GPU to a peer GPU.

When the current request count reaches the threshold count, the access counter subsystem 170 notifies a driver. The notification may include a counter identifier, or other identifying information, such as an address range, page number, or page number range. The threshold count may be fixed or programmable for each hardware counter 171 and/or 172.

In one embodiment, a hardware counter 171 is allocated from a pool of hardware counters (171(0) through 171(C)) when a new address range is encountered. A companion hardware counter 172 may also be allocated along with hardware counter 171. If no free hardware counters are available from the pool of hardware counters, then a currently allocated hardware counter 171 is freed according to a replacement policy. One exemplary replacement policy is a least recently used policy, where a hardware counter that was least recently accessed is cleared and allocated to count the new address range. Other technically feasible replacement policies may also be implemented.

A circular buffer 174 may be configured to receive notifications from hardware counters 171, 172 and queue the notifications as buffer entries 175, to be transmitted to DRAMs 168, and/or further transmitted to the driver. In one embodiment, the driver is configured to execute on a CPU (e.g. of the CPUs/peer processing units 178, 179). The circular buffer 174 may include a control circuit 176, configured to manage receiving notifications, generating buffer entries 175 from the notifications, and transmitting the notifications to DRAM 168 and/or the driver.

Figure 1G:
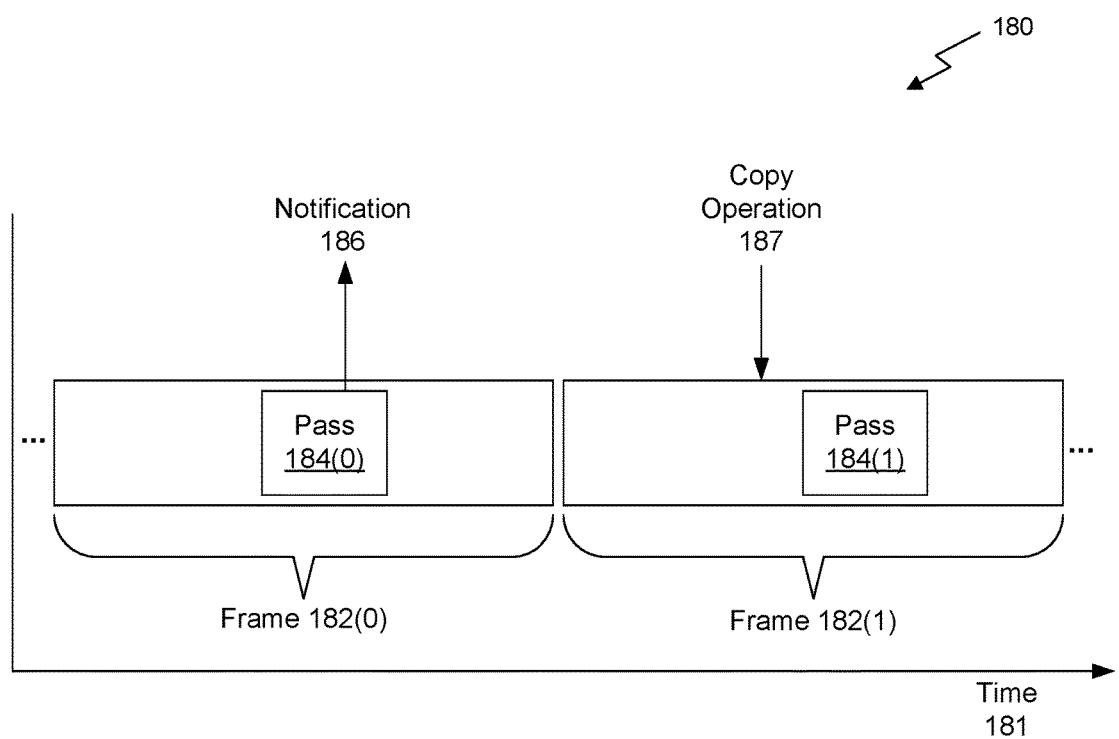
FIG. 1G illustrates an exemplary chronology for copying and accessing pages of data, in accordance with one embodiment.

FIG. 1G illustrates an exemplary chronology 180 for copying and accessing pages of data, in accordance with one embodiment. The chronology 180 depicts rendering a sequence of frames 182(0), 182(1), and so forth along a time line 181. Rendering each frame 182 includes a rendering pass 184 comprising a sequence of commands (e.g., primitive commands) in a command stream. As shown, during the course of rendering pass 184(0) in frame 182(0), a threshold number of access requests are generated from a first GPU 139 to the same page of data in a memory of a second GPU 139, thereby causing a notification 186 to be generated. The access requests are counted by a hardware counter 171. The access requests may be required to match certain criteria in addition to matching a specified address range. For example, the access requests may need to occur during a specified rendering pass (e.g., rendering pass 184) of a given frame. Additionally, the access requests may need to occur during execution of a specified context. Furthermore, the access requests may need to be generated by threads with a sub-context selected by a channel mask for the hardware counter 171. Such requirements may be used by the driver to schedule when a copy operation 187 should be executed.

The notification 186 indicates that an access count to an identified page (or pages) of peer memory data has hit the threshold number of accesses, and that the page (or pages) of data should be copied prior to execution of rendering pass 184 in a subsequent frame 182. For example, notification 186 is generated during execution of rendering pass 184(0) of frame 182(0). Therefore, the driver schedules a copy operation 187 to occur prior to rendering pass 184(1) of frame 182(1). A semaphore may be implemented to force ordering between completion of the copy operation 187 and the start of rendering pass 184(1). Alternatively, the semaphore may force ordering between completion of the copy operation 187 and execution of the first command of rendering pass 184(1) that accesses the identified page of data. Once the copy operation 187 completes, access to the page of data by the first GPU 139 may be obtained from a local copy, advantageously reducing latency and reducing utilization of the high-speed link 150.

In one embodiment, the threshold is calculated to be substantially equivalent to an amount of data associated with copying a page (or pages). The threshold can be calculated according to a specific number of bytes, whole pages, or a utilization factor for utilizing the high-speed link 150. In one embodiment, the threshold is calculated by the driver. In another embodiment, the threshold is calculated according to a given system design.

In an exemplary implementation, the first GPU 139 receives and executes a copy command to perform copy operation 187 on the identified page of data from the memory of the second GPU 139 prior to the first GPU 139 accessing the identified page of data in connection with rendering pass 184(1) of frame 182(1).

Parallel Processing Architecture

Figure 2:
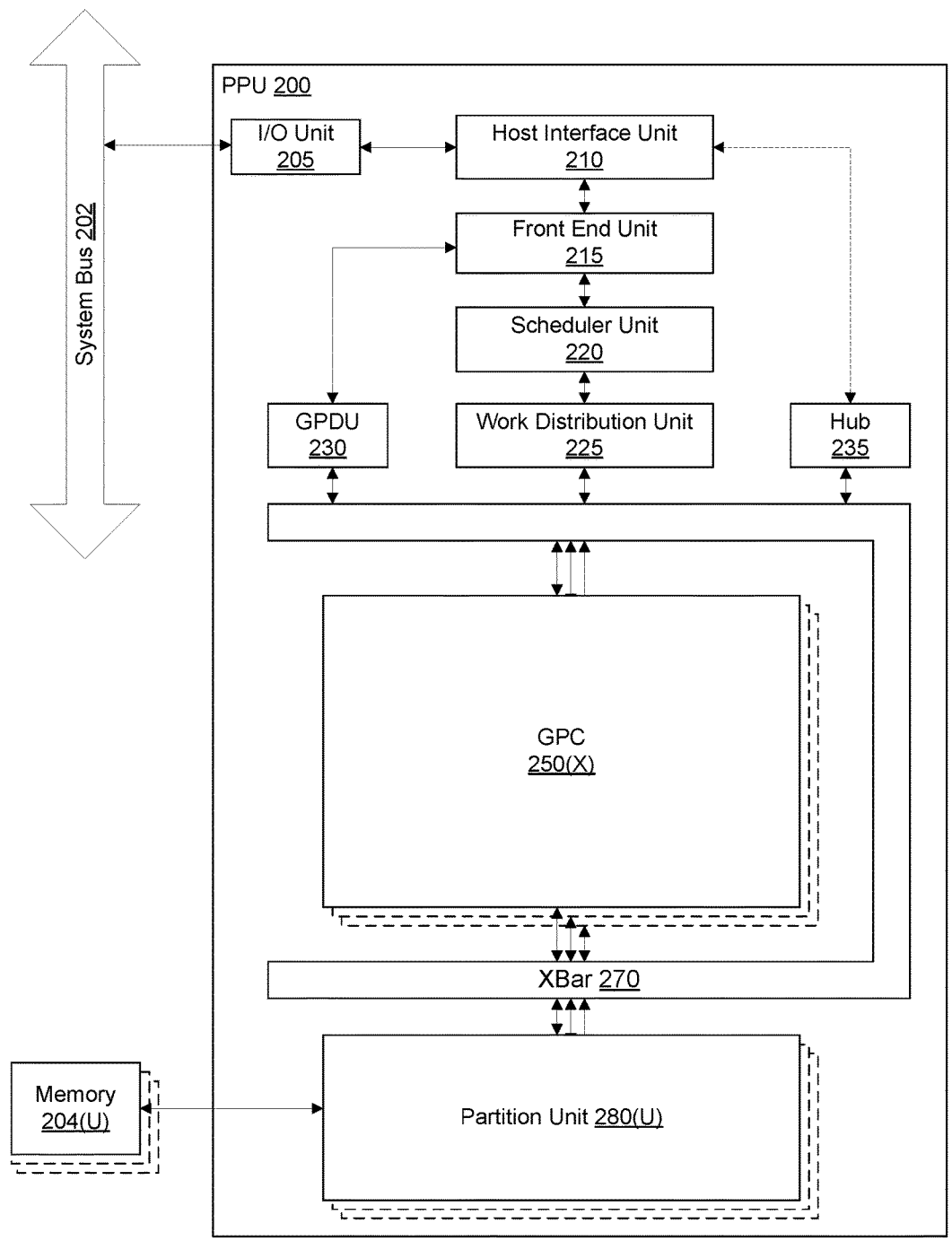
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
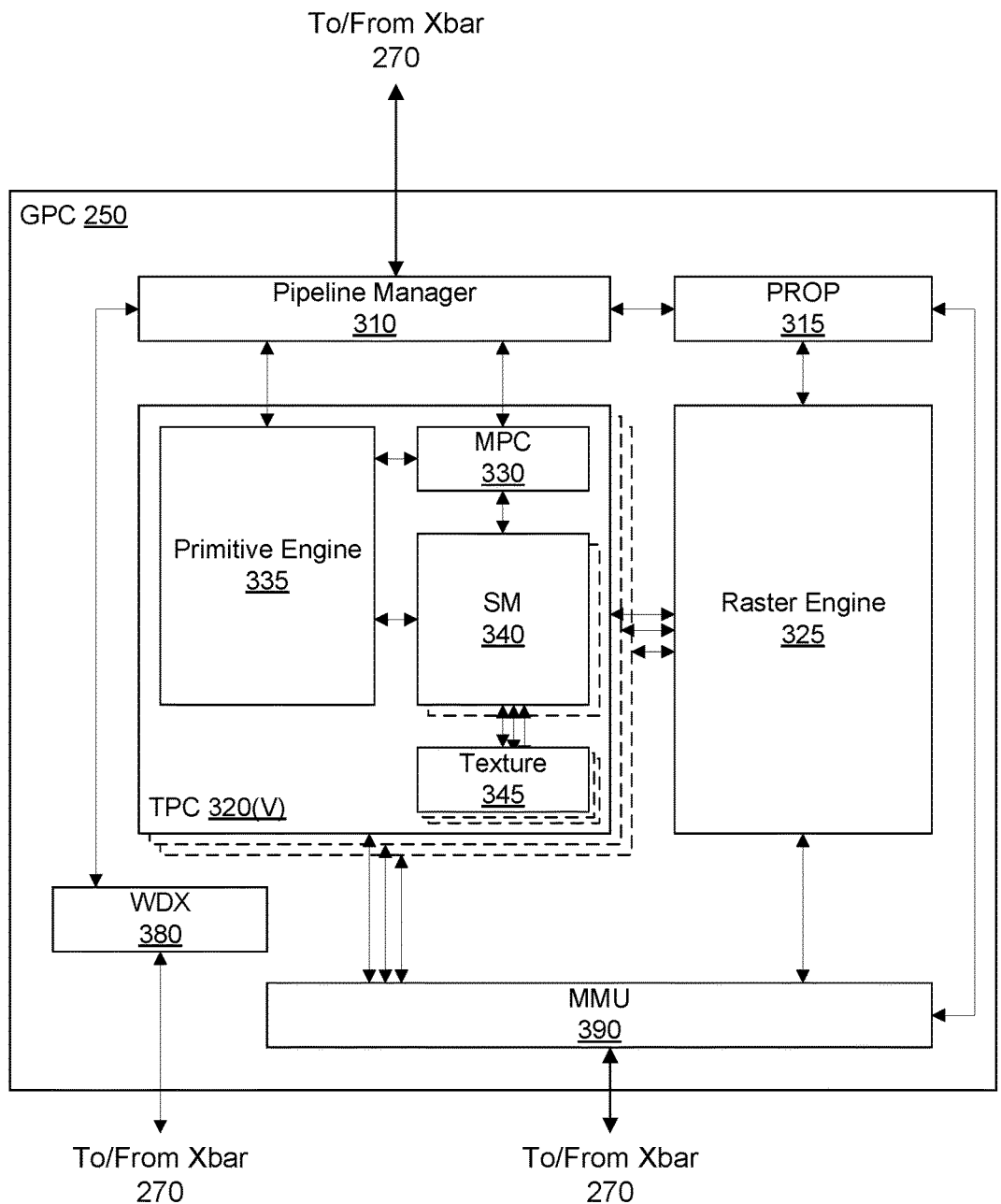
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
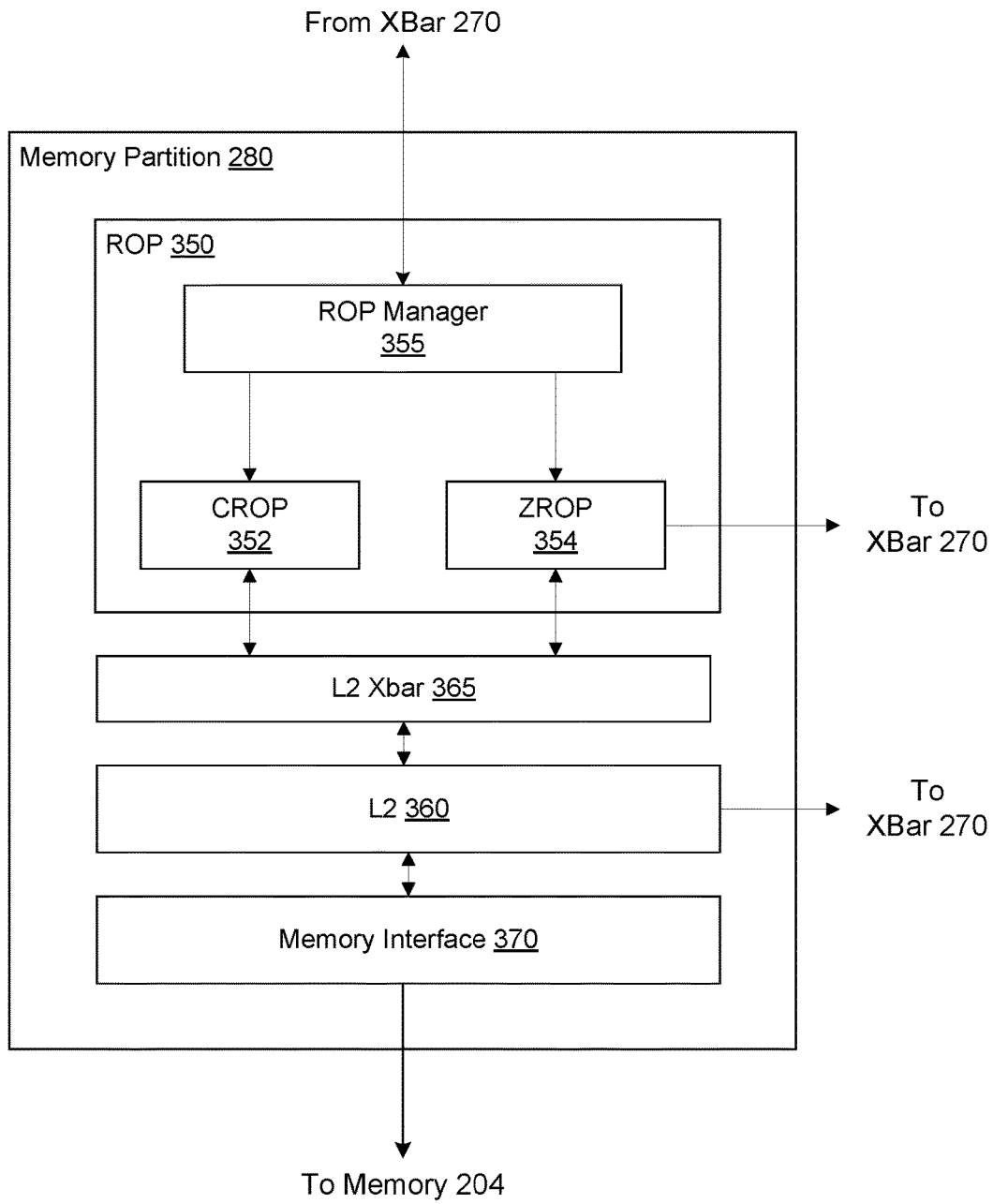
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
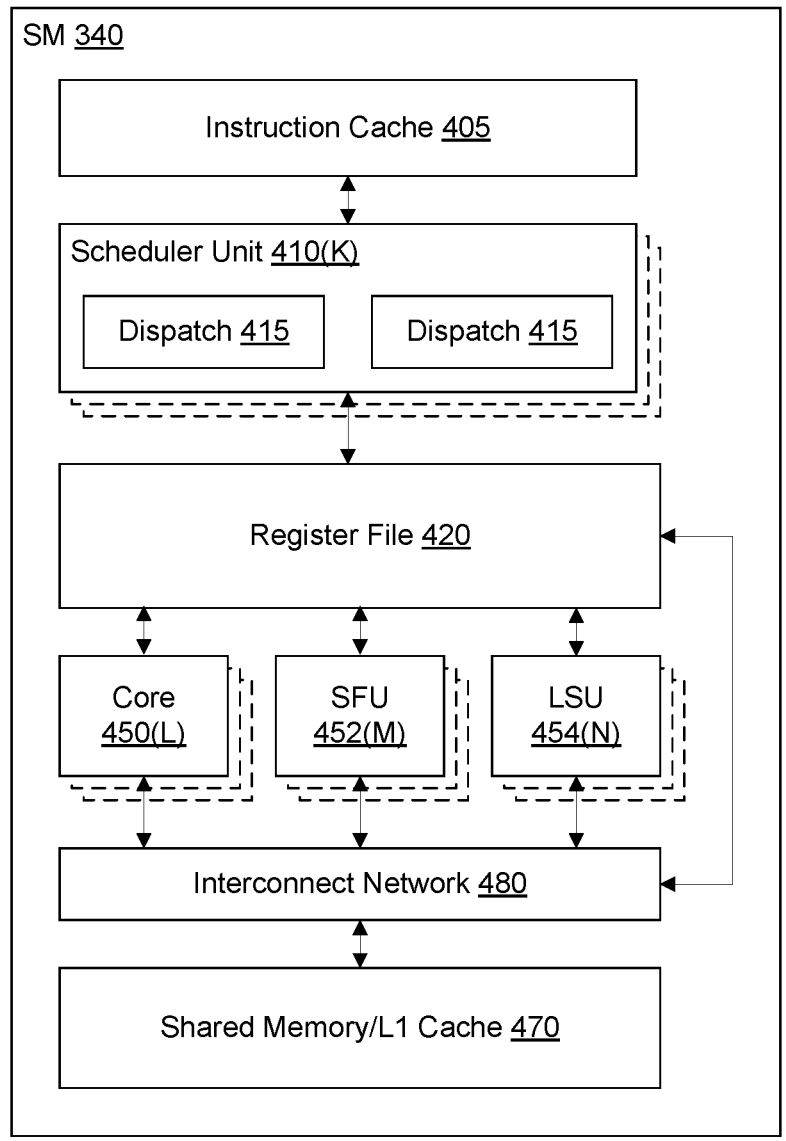
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., pixel blending operations, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
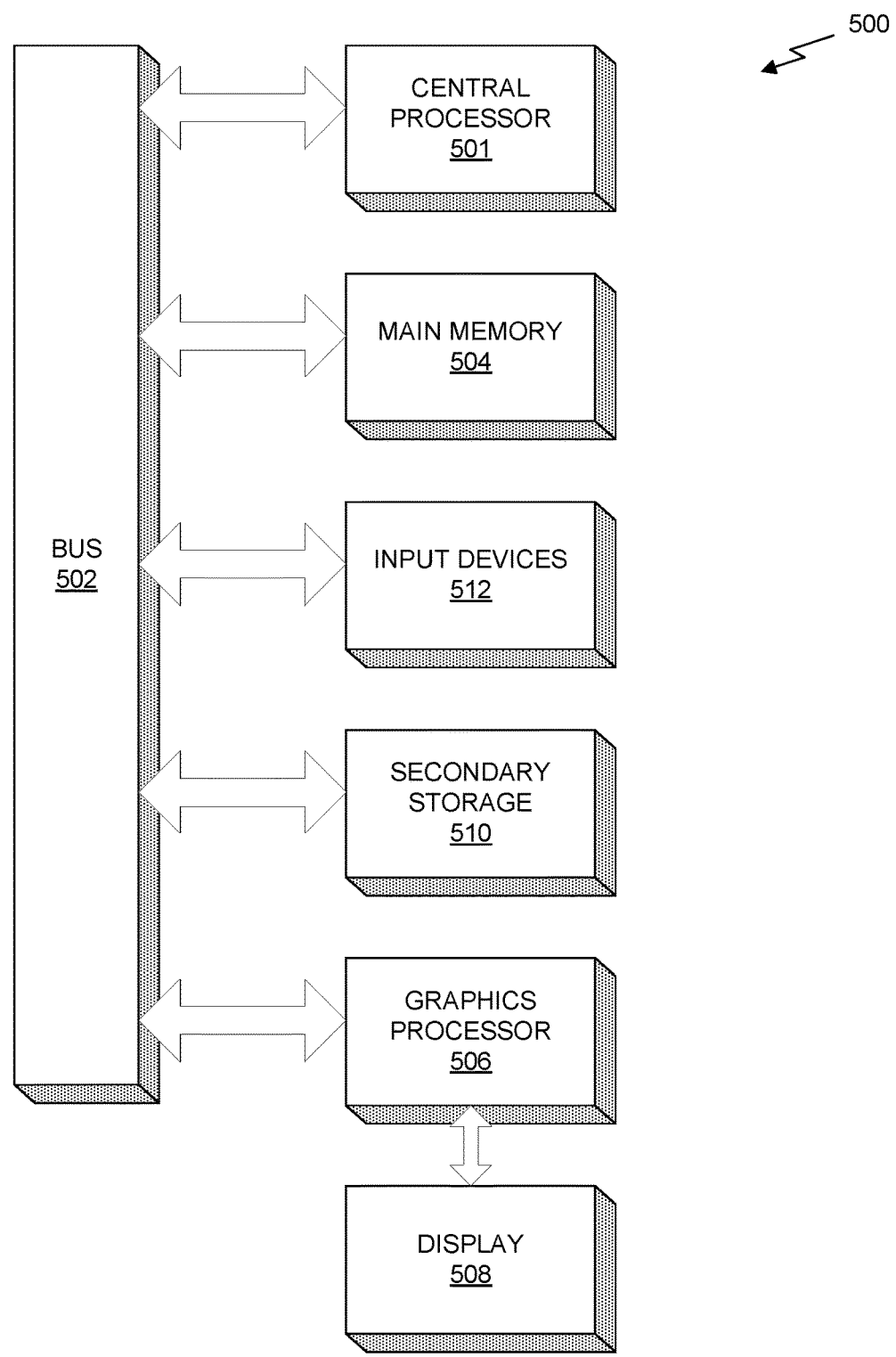
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

Figure 6:
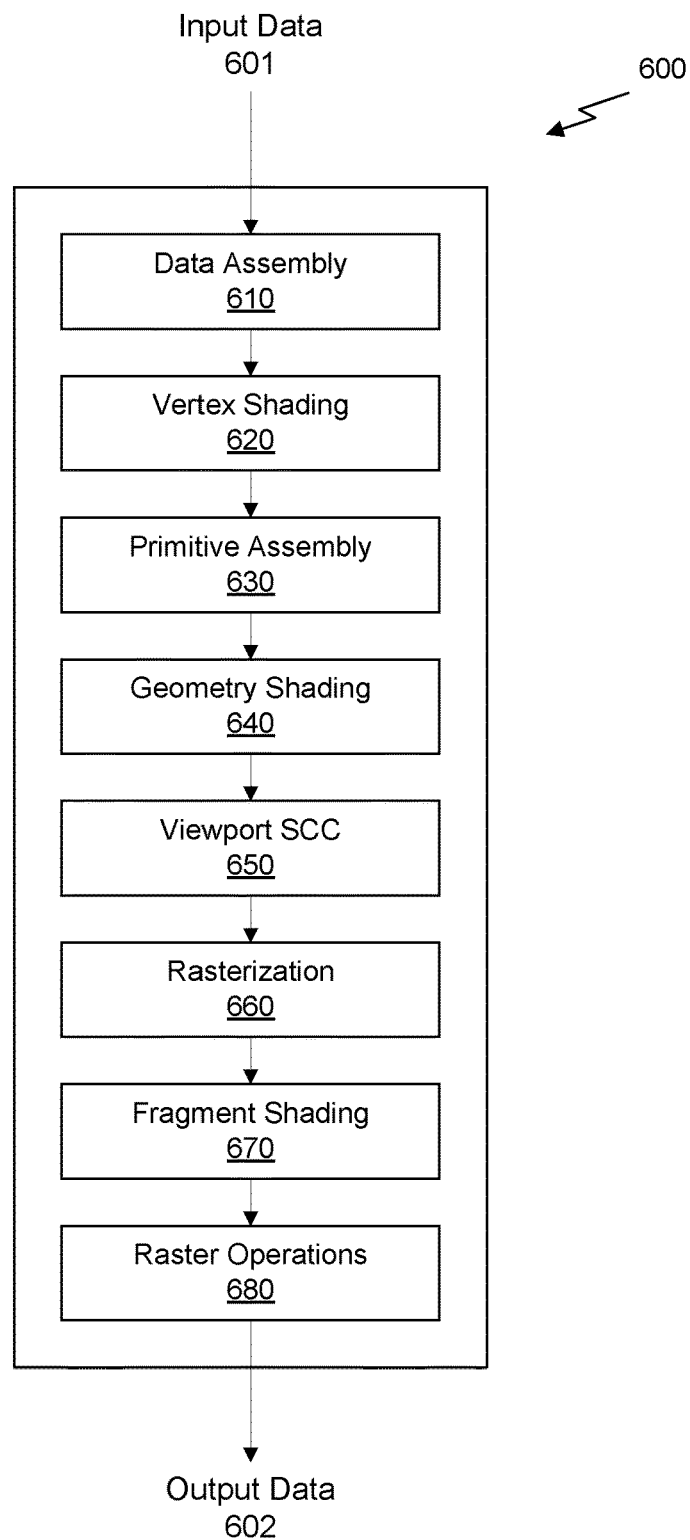
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 501. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 501. In other instances, the device driver may perform operations, at least in part, by launching operations on the PPU 200 utilizing an input/output interface between the CPU 501 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7A:
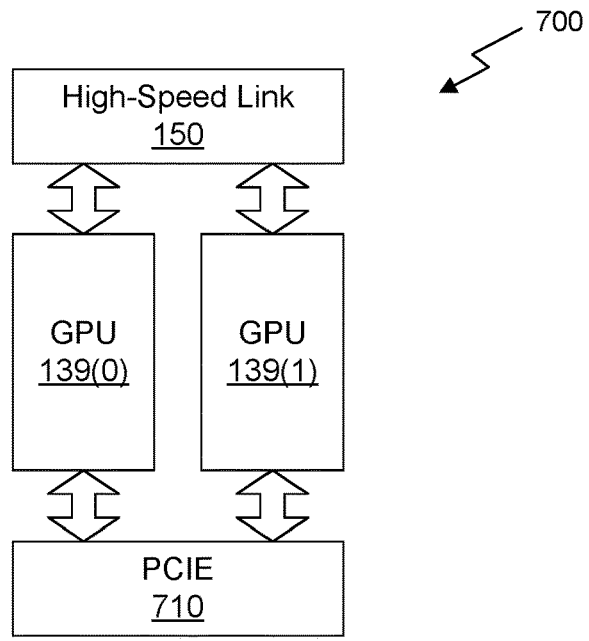
FIG. 7A is a conceptual diagram of a two processor configuration, in accordance with one embodiment.

FIG. 7A is a conceptual diagram of a two processor configuration 700, in accordance with one embodiment. As shown, a first GPU 139(0) and a second GPU 139(1) are configured to communicate through a high-speed link 150 and a system interface such as a PCIe interface 710. Communication through the high-speed link 150 includes, without limitation, transmitting, copying and/or moving pages of data from a source memory circuit at one GPU 139 to a target memory circuit at the other GPU 139. The data may be represented in a compressed format or not compressed. In one embodiment, the PCIe interface 710 is coupled to a CPU (not shown), and the CPU is configured to execute at least one driver for the GPUs 139. The at least one driver is configured to perform various techniques described herein, such as the method 120 of FIG. 1C. Furthermore, the GPUs 139 are configured to perform method 100 of FIG. 1A and/or method 110 of FIG. 1B.

In one embodiment, the first GPU and the second GPU are coupled together using a first high-speed link 150 (e.g., NVLINK) and configured to render frames for a first display device (not shown). In another embodiment, illustrated in FIG. 7B, a third GPU and a fourth GPU are coupled together using a second high-speed link 150(1) and configured to render frames for a second display device. The first GPU through fourth GPU may be further coupled together using another type of high-speed interconnect, shown herein as a PCI express (PCIe) interface 710, to provide communication among the GPUs.

Figure 7B:
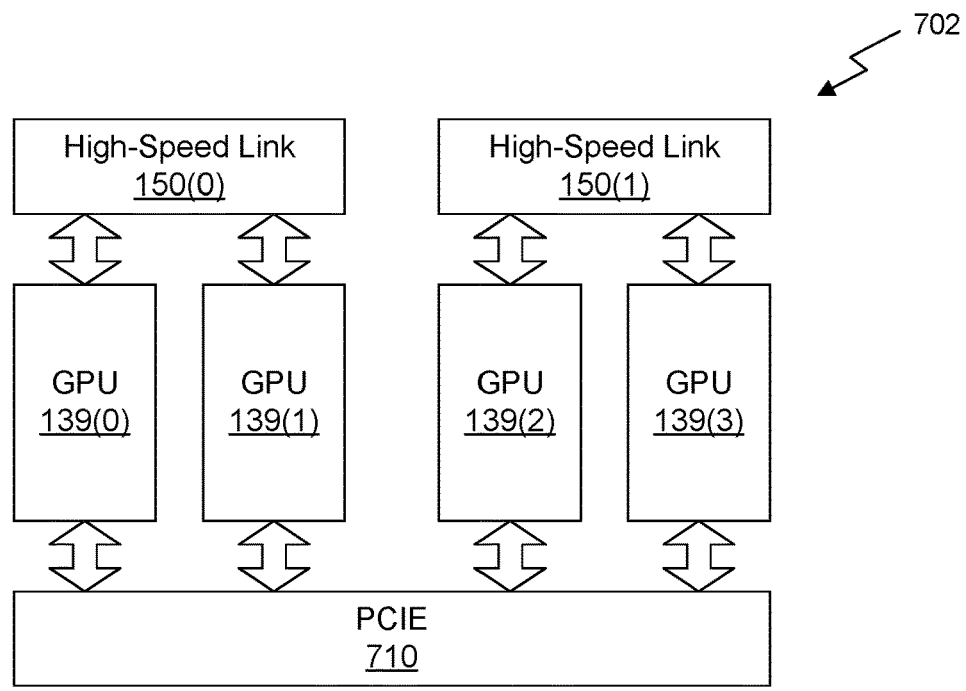
FIG. 7B is a conceptual diagram of a four processor configuration, in accordance with one embodiment.

FIG. 7B is a conceptual diagram of a four processor configuration 702, in accordance with one embodiment. As shown, a first GPU 139(0) and a second GPU 139(1) are configured to communicate through a first high-speed link 150(0) and a system interface such as a PCIe interface 710. Furthermore, a third GPU 139(2) and a fourth GPU 139(3) are configured to communicate through a second high-speed link 150(1) and a system interface such as PCIe interface 710. Communication through the high-speed links 150(0), 150(1) includes, without limitation, transmitting, copying and/or moving pages of data from a source memory circuit at one GPU 139 to a target memory circuit at a different GPU 139. In one embodiment, the PCIe interface 710 is coupled to a CPU (not shown), and the CPU is configured to execute at least one driver for the GPUs 139. The at least one driver is configured to perform various techniques described herein, such as the method 120 of FIG. 1C. Furthermore, the GPUs 139 are configured to perform method 100 of FIG. 1A and/or method 110 of FIG. 1B. While two GPUs 139 are shown coupled to each high-speed link 150, various embodiments may implement different high-speed link configurations that accommodate more than two GPUs 139.

Figure 7C:
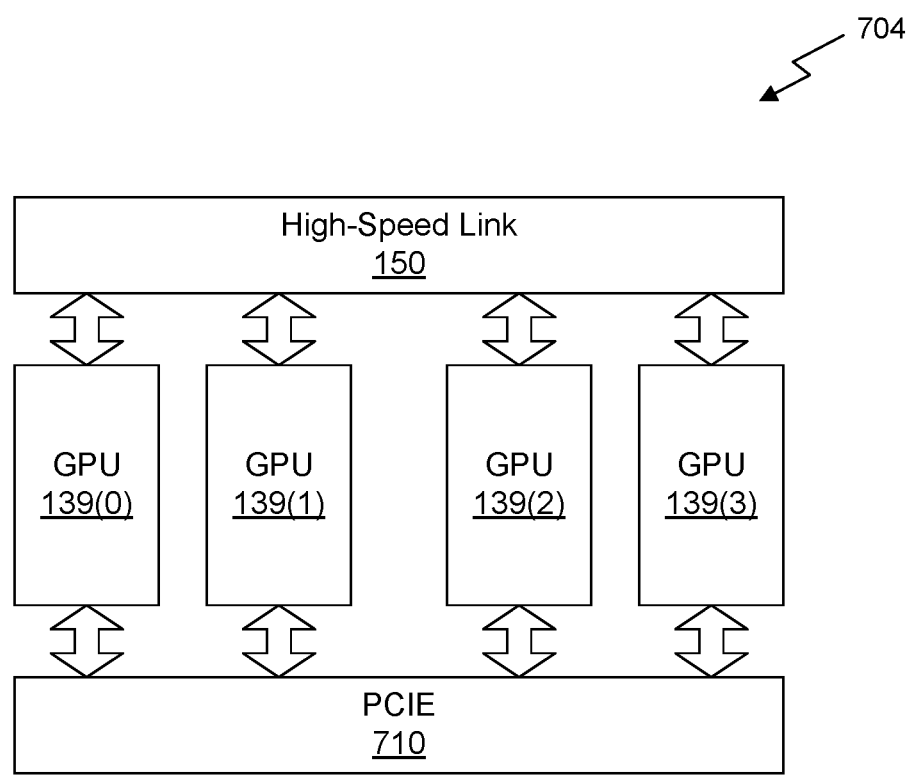
FIG. 7C is a conceptual diagram of a second four processor configuration, in accordance with one embodiment.

FIG. 7C is a conceptual diagram of a second four processor configuration 704, in accordance with one embodiment. As shown, four GPUs 139(0), 139(1), 139(2), and 139(3) are configured to communicate through a high-speed link 150(0) and a system interface such as a PCIe interface 710. Communication through the high-speed link 150 includes, without limitation, transmitting, copying and/or moving pages of data from a source memory circuit at one GPU 139 to a target memory circuit at a different GPU 139. In one embodiment, the PCIe interface 710 is coupled to a CPU (not shown), and the CPU is configured to execute at least one driver for the GPUs 139. The at least one driver is configured to perform various techniques described herein, such as the method 120 of FIG. 1C. Furthermore, the GPUs 139 are configured to perform method 100 of FIG. 1A and/or method 110 of FIG. 1B. While four GPUs 139 are shown coupled to high-speed link 150, various embodiments may implement different high-speed link configurations that accommodate, three GPUs 139, or more than four GPUs 139.

In one embodiment, GPU 139(0) and GPU 139(1) are configured to render a first frame. In another embodiment, GPU 139(2) and GPU 139(3) are configured to render a second frame. In certain embodiments, the first fame is displayed on the left side of a virtual-reality display system and the second frame is displayed on the right side of the virtual-reality display system. In certain embodiments AFR is implemented with GPUs 139(0) through 139(3). For example, GPUs 139(0), 139(1) may work together using checkerboard work allocation to render even frames, and GPUs 139(2), 139(3) may work together using checkerboard work allocation to render odd frames. In another example, GPUs 139(0), 139(1) may work together using checkerboard work allocation to render left eye frames in a virtual reality system, and GPUs 139(2), 139(3) may work together using checkerboard work allocation to render right eye frames in the virtual reality system.

Distributing rendering on multiple GPUs reduces rendering latency and provides a general and scalable GPU computation environment relative to conventional techniques. Access to data stored in a remote memory is provided through a high-speed data link coupled to the multiple GPUs. Hardware access counters in each GPU are configured to identify highly accessed pages of data retrieved from the remote memory while a frame is rendered, triggering a notification to be sent to an associated driver. In response to the notification, the driver schedules an operation to copy the identified page of data from the remote memory to the local memory of the GPU prior to rendering a subsequent frame. The hardware access counter may selectively count access requests to the same page of data, based on rendering pass, context, and additional conditions.

In one embodiment, a local L2 cache is configured to coalesce requests before performing a write back operation to improve transfer efficiency. Similarly, the local L2 cache may coalesce adjoined requests, also to improve transfer efficiency by turning multiple small requests into a larger block transfer. In particular, this L2 cache behavior may be implemented by configuring the L2 cache to use a write-back policy for a peer aperture.

In certain embodiments, the driver is configured to occasionally perform experiments by adjusting settings and recording which settings are beneficial for future use. For example, the driver can try using a surface in a particular pass using direct remote access and then using a pre-resolving copy. By measuring performance for both surface access configurations, the driver can select the faster configuration for normal or extended operation. Another experiment the driver may perform is to broadcast all rendering to all GPUs as opposed to distributing the work. Broadcasting clearly gives no scaling, but also does no harm and is useful whenever a pass is low on processing requirements but produces large amounts of data. Shadow map rendering is such an example. If the work is distributed, the complete shadow map is available in both GPUs for later use.

The driver might decide that certain passes can be performed entirely on one GPU and other passes performed entirely on another GPU. Shadow map rendering is an example where this approach can have benefits. In a scenario where there are N light sources on a scene requiring N shadow maps, one GPU might process the generation of N/2 shadow maps, while another GPU can process the remaining shadow maps. While the GPUs are rendering the next set of shadow maps, the completed shadow maps can be asynchronously copied over to the other GPU (e.g., using the copy engine (CE)).

Driver Methods

In various embodiments, the driver may implement certain methods and techniques for dynamically managing and optimizing GPU operation and data placement for multiple GPUs. For example, the driver may run different experiments, each with different settings to determine which setting or combination of settings best optimize one or more execution metrics (e.g., frame rate, rendering latency, etc.). During and/or after each experiment, the driver measures execution metrics that indicate resulting performance for the experiment. Each experiment may be applied to one or more rendered frames. A given experiment or sequence of experiments may be run periodically, at an application start up, in response to changes or instructions from an application, at a specific point during execution of an application (e.g., at the start of a new game level), or in response to any other technically feasible trigger. A useful experiment can typically be run in one frame time (or potentially less). Consequently, ongoing, dynamic optimization may be performed periodically and/or at various points in application execution without interfering with normal operation of the application.

The settings include, without limitation, whether to copy or not copy a given page or pages (e.g., intensely accessed pages), whether to broadcast rendering to all GPUs or distribute rendering among the GPUs, and which GPUs are tasked to render which rendering passes. More generally, the settings may include any technically feasible variations in mapping computational tasks to multiple GPUs.

In an exemplary experiment, the driver selects one or more settings that render a first frame without scheduling copy commands (a copy setting of "no"), causing any access requests to remote data to require a remote access rather than having the data copied locally in advance (a copy setting of "yes"). While the first frame is rendered, the driver may receive one or more notifications that identify certain pages of data as having met an access count threshold (candidates to be copied). In a subsequent second frame, the driver may schedule copy commands to copy the identified pages of data to a consuming GPU prior to the pages of data being accessed by the consuming GPU. A first rendering time is measured for the first frame and a second rendering time is measured for the second frame. The driver may then proceed using whichever setting (copy "yes" or "no") provides a superior rendering time. Furthermore, the driver may periodically run this and/or additional experiments using a variety of different settings to dynamically optimize performance.

In one embodiment, the driver examines a given workload to generate a data access locality estimate for the workload. In certain scenarios the workload may be associated with rendering one or more frames, while in other scenarios the workload may be associated with more general computational tasks. The driver determines a workload split that distributes the workload among the GPUs based on the data access locality estimate. In an exemplary experiment, the driver selects one or more settings to render a first frame according to a workload split that is based on the data access locality estimate for the frame. The driver may generate different data access locality estimates and determine different workload splits based on the different data access locality estimates. The driver may then render multiple frames according to the different workload splits and measure one or more execution metrics for the frames. The driver may then select a workload split that optimizes a particular execution metric, such as rendering time or task completion time. The driver may use an execution metric for one experimental run to refine a subsequent data access locality estimate. In certain embodiments, the driver performs one or more experiments (e.g., on a characteristic subset of the workload) to determine an optimal workload split among the GPUs prior to dispatching the actual workload on the GPUs.

Figure 8:
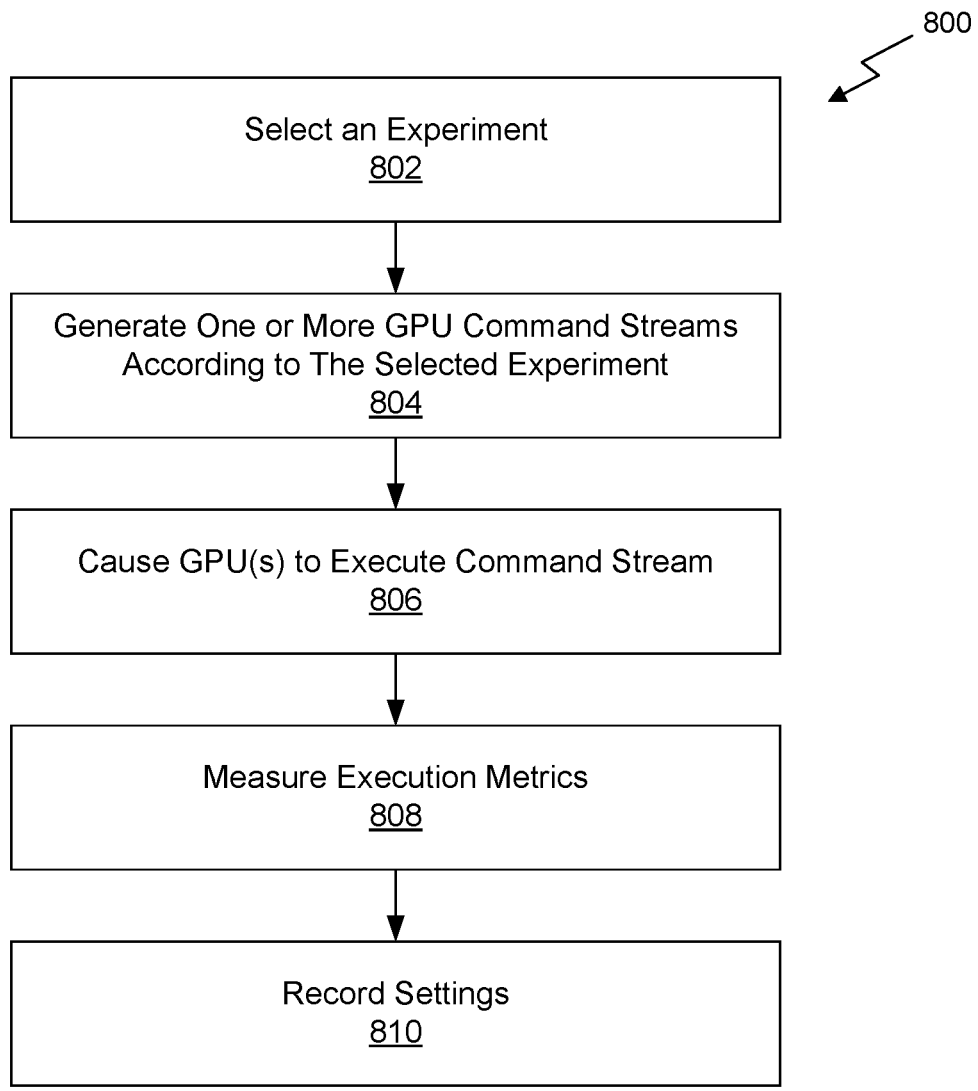
FIG. 8 illustrates a flowchart of a method 800 for managing GPU operation, in accordance with one embodiment.

FIG. 8 illustrates a flowchart of a method 800 for managing GPU operation, in accordance with one embodiment. Although the method 800 is described in conjunction with the systems of FIGS. 2-7, any processing system that implements method 800 is within the scope and spirit of embodiments of the present disclosure. In various embodiments, method 800 is implemented in the context of a graphics system, configured to render graphics frames from scene information comprising graphics primitives. One or more operations of the method 800 may be performed by task-specific circuitry or by a combination of task-specific circuitry and general-purpose processing units. In one embodiment, method 800 is performed by a processing system, which may include a general purpose central processing unit (CPU), a parallel (PPU), such as PPU 200 of FIG. 2, or any combination thereof. In one embodiment, a processing unit (e.g., a CPU) is configured to execute a driver to perform method 800.

At step 802, the processing unit selects an experiment. The driver may select the experiment periodically, at an application start up, in response to changes or instructions from an application, at a specific point during execution of an application, or in response to any other technically feasible trigger. In one embodiment, the driver may select among a set of different predefined experiments. In another embodiment, the driver may select an experiment by traversing a tree of different available setting configurations. A given experiment specifies specific settings and variations of the settings. At step 804, the processing unit generates one or more GPU command streams according to the elected experiment.

At step 806, the processing unit causes two or more GPUs to execute the one or more GPU command streams. In certain scenarios, each of the two or more GPUs is directed to execute a copy of a GPU command stream. In other scenarios, each of the two or more GPUs is directed to execute a distinct GPU command stream constructed for the GPU. At step 808, the processing unit measures one or more execution metrics. For example, the processing unit may measure a rendering time for different frames rendered according to different settings specified by the selected experiment. If a given experiment includes N different combinations of settings, then N different measurements are taken, with each measurement corresponding to one of the N different combinations. At step 810, the processing unit records the settings. In one embodiment, the processing unit identifies one set of settings that best optimizes one or more specific execution metrics. The processing unit may then generate additional GPU command streams for the two or more GPUs according to the identified settings.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A computer-implemented method, comprising:
receiving, by a first processing unit coupled to a first graphics processing unit (GPU), a notification generated by the first GPU that an access request count has reached a specified threshold, wherein the access request count indicates a number of access requests generated during rendering of a first frame by the first GPU targeting a first page of data residing at a second GPU;
scheduling, by the first processing unit, a copy command to copy the first page of data to a first memory circuit of the first GPU from a second memory circuit of the second GPU before the first GPU accesses the first page of data during rendering of a second frame; and
inserting, by the first processing unit, the copy command within a GPU command stream for rendering the second frame,
wherein the first page of data is copied to the first memory circuit.

2. The computer-implemented method of claim 1, wherein the GPU command stream is executed by the first GPU.

3. The computer-implemented method of claim 1, wherein the copy command is scheduled to execute after the first GPU accesses the first page of data during rendering of the first frame.

4. The computer-implemented method of claim 1, wherein the GPU command stream comprises a semaphore configured to guarantee completion of the copy command prior to the start of rendering of the second frame.

5. The computer-implemented method of claim 1, wherein the notification includes at least one of a counter identifier, an address range, a page number, and a page number range.

6. The computer-implemented method of claim 1, wherein the access request count is accumulated by a hardware counter within the first GPU.

7. The computer-implemented method of claim 1, wherein the first page of data is stored in a compressed format within the second memory circuit and the copy of the first page of data is stored in the compressed format within the first memory circuit.

8. The computer-implemented method of claim 7, wherein the first page of data is copied in the compressed format.

9. The computer-implemented method of claim 1, wherein the first page of data is stored in a compressed format within the second memory circuit and the copy of the first page of data is stored in the compressed format within the first memory circuit.

10. The computer-implemented method of claim 9, wherein the first page of data is copied in the compressed format.

11. A computer-implemented method, comprising:
selecting, by a first processing unit coupled to a first graphics processing unit (GPU), an experiment, wherein the first GPU is configured to generate a number of access requests targeting a first page of data residing at a second GPU;
generating, by the first processing unit, one or more GPU command streams according to the selected experiment;
causing, by the first processing unit, the first GPU to execute one of the one or more GPU command streams and the second GPU to execute one of the one or more GPU command streams;
measuring, by the first processing unit, execution metrics associated with the one or more GPU command streams;
recording, by the first processing unit, the execution metrics associated with the one or more GPU command streams;
receiving, by the first processing unit, a notification that an access request count has reached a specified threshold, wherein the access request count indicates a number of access requests generated by the first GPU targeting a first page of data residing at a second GPU; and
scheduling, by the first processing unit, a copy command to copy the first page of data to a first memory circuit of the first GPU from a second memory circuit of the second GPU for rendering a frame by the first GPU.

12. The computer-implemented method of claim 11, wherein recording comprises identifying a set of settings that best optimizes one or more execution metrics.

13. The computer-implemented method of claim 12, further comprising generating additional GPU command streams according to the identified set of settings.

14. A processing system, configured to:
receive, by a first processing unit coupled to a first graphics processing unit (GPU), a notification generated by the first GPU that an access request count has reached a specified threshold, wherein the access request count indicates a number of access requests generated during rendering of a first frame by the first GPU targeting a first page of data residing at a second GPU;
schedule, by the first processing unit, a copy command to copy the first page of data to a first memory circuit of the first GPU from a second memory circuit of the second GPU before the first GPU accesses the first page of data during rendering of a second frame; and
insert, by the first processing unit, the copy command within a GPU command stream for rendering the second frame,
wherein the first page of data is copied to the first memory circuit.

15. The processing system of claim 14, wherein the notification includes at least one of a counter identifier, an address range, a page number, and a page number range.

16. The processing system of claim 14, wherein the access request count is accumulated by a hardware counter within the first GPU.

17. A processing system configured to:
select, by a first processing unit coupled to a first graphics processing unit (GPU), an experiment, wherein the first GPU is configured to generate a number of access requests targeting a first page of data residing at a second CPU;
generate, by the first processing unit, one or more CPU command streams according to the selected experiment;
cause, by the first processing unit, the first GPU to execute one of the one or more GPU command streams and the second GPU to execute one of the one or more CPU command streams;
measure, by the first processing unit, execution metrics associated with the one or more GPU command streams; record, by the first processing unit, the execution metrics associated with the one or more GPU command streams;
receive, by the first processing unit, a notification that an access request count has reached a specified threshold, wherein the access request count indicates a number of access requests generated by the first GPU targeting a first page of data residing at a second CPU; and
schedule, by the first processing unit, a copy command to copy the first page of data to a first memory circuit of the first CPU from a second memory circuit of the second CPU for rendering a frame by the first GPU.

18. The processing system of claim 17, wherein recording comprises identifying a set of settings that best optimizes one or more execution metrics.

19. A non-transitory, computer-readable storage medium storing instructions that, when executed by a first processing unit coupled to a first graphics processing unit (GPU), cause the processor to:
receive, by the first processing unit, a notification generated by the first GPU that an access request count has reached a specified threshold, wherein the access request count indicates a number of access requests generated during rendering of a first frame by the first GPU targeting a first page of data residing at a second GPU;
schedule, by the first processing unit, a copy command to copy the first page of data to a first memory circuit of the first GPU from a second memory circuit of the second GPU before the first GPU accesses the first page of data during rendering of a second frame; and
insert, by the first processing unit, the copy command within a GPU command stream for rendering the second frame,
wherein the first page of data is copied to the first memory circuit.

* * * * *